US012763893B2

(12) United States Patent
Jiang et al.

(10) Patent No.: US 12,763,893 B2
(45) Date of Patent: Oct. 13, 2026

(54) METHOD AND DEVICE FOR QUASI CO-LOCATION DETERMINATION IN WIRELESS COMMUNICATION

(71) Applicant: Apogee 5G Global, LLC, Plano, TX (US)

(72) Inventors: Qi Jiang, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 569 days.

(21) Appl. No.: 17/735,135

(22) Filed: May 3, 2022

(65) Prior Publication Data

US 2022/0376857 A1 Nov. 24, 2022

(30) Foreign Application Priority Data

May 24, 2021 (CN) ........................ 202110564185.9

(51) Int. Cl.
*H04L 5/00* (2006.01)
*H04L 1/00* (2006.01)
(Continued)

(52) U.S. Cl.
CPC .......... *H04L 5/0048* (2013.01); *H04L 1/0061* (2013.01); *H04W 72/044* (2013.01); *H04W 72/23* (2023.01)

(58) Field of Classification Search
CPC ... H04L 5/0048; H04L 1/0061; H04L 1/0025; H04L 5/0053; H04W 72/044;
(Continued)

(56) References Cited

U.S. PATENT DOCUMENTS

2020/0120696 A1 4/2020 Wu et al.

FOREIGN PATENT DOCUMENTS

CN 108809578 A 11/2018
CN 110958589 A 4/2020
(Continued)

OTHER PUBLICATIONS

Notification to Grant Patent Right for Invention of Chinese patent application No. CN202110564185.9 dated Jan. 18, 2024.
(Continued)

*Primary Examiner* — Mandish K Randhawa
(74) *Attorney, Agent, or Firm* — Volpe Koenig

(57) ABSTRACT

The present disclosure provides a method and device in a node used for wireless communications. A node first receives a first signaling in a first time-frequency resource set, the first signaling is used to indicate a first reference signal resource; then receives a second signaling in a second time-frequency resource set; the first time-frequency resource set and the second time-frequency resource set are associated with a candidate resource set, the candidate resource set supports a DCI format scrambled by a first ID, and the second time-frequency resource set is located after the first time-frequency resource set; a demodulation reference signal of a channel occupied by the second signaling is quasi co-located with a target reference signal resource. The application improves the method and device for updating TCI state in the case of M-TRP supporting multicast, so as to optimize the system performance.

18 Claims, 3 Drawing Sheets

(51) Int. Cl.
*H04W 72/044* (2023.01)
*H04W 72/23* (2023.01)

(58) Field of Classification Search
CPC ..... H04W 72/23; H04W 72/232; H04W 4/06; H04W 72/0446; H04W 72/0453; H04W 72/1263
See application file for complete search history.

(56) References Cited

FOREIGN PATENT DOCUMENTS

| | | | |
|---|---|---|---|
| CN | 111769928 | A | 10/2020 |
| CN | 112713972 | A | 4/2021 |
| WO | 2021043105 | A1 | 3/2021 |

OTHER PUBLICATIONS

First Search Report of Chinese patent application No. CN202110564185.9 dated Nov. 23, 2023.

Third Generation Partnership Project, "Technical Specification Group Radio Access Network; NR; Physical channels and modulation (Release 16)," 3GPP TS 38.211 V 16.5.0 (Mar. 2021).

Third Generation Partnership Project, "Technical Specification Group Radio Access Network; NR; Multiplexing and channel coding (Release 16)," 3GPP TS 38.212 V16.5.0 (Mar. 2021).

Third Generation Partnership Project, "Technical Specification Group Radio Access Network; NR; Physical layer procedures for control (Release 16)," 3GPP TS 38.213 V 16.5.0 (Mar. 2021).

Third Generation Partnership Project, "Technical Specification Group Radio Access Network; NR; Physical layer procedures for data (Release 16)," 3GPP TS 38.214 V 16.5.0 (Mar. 2021).

METHOD AND DEVICE FOR QUASI CO-LOCATION DETERMINATION IN WIRELESS COMMUNICATION

CROSS REFERENCE TO RELATED APPLICATIONS

This application claims the priority benefit of Chinese Patent Application No. 202110564185.9, filed on May 24, 2021, the full disclosure of which is incorporated herein by reference.

BACKGROUND

Technical Field

The present disclosure relates to transmission methods and devices in wireless communication systems, and in particular to a design scheme and device of transmission of a control channel and a data channel.

Related Art

New Radio (NR) Rel-17 standard has begun to discuss how to support transmission of multicast and broadcast traffic under 5G architecture. In traditional Long-Term Evolution (LIE) and Long-Term Evolution Advanced (LTE-A) systems, a base station supports a terminal to receive multicast and groupcast traffic through Multicast Broadcast Single Frequency Network (MBSFN) and the method of Single-Cell Point-To-Multipoint (SC-PTM).

Meanwhile, in NR R15 and R16, a control channel and a data channel adopt different beam management/indication mechanisms, and uplink and downlink also adopt different beam management/indication mechanisms. However, in many cases, the control channel and the data channel can adopt a same beam, and there exists channel reciprocity between uplink and downlink channels in many application scenarios, so that the same beam can be used. Using this feature can greatly reduce the complexity of the system, signaling overhead and delay. In 3GPP Radio Access Network (RAN) 1 #103e meeting, the technology of adopting a physical layer signaling to update beams of the control channel and data channel at the same time has been approved, and in the scenario where uplink and downlink channel reciprocity exists, the uplink and downlink beams can be updated simultaneously with a physical layer signaling. At 3GPP RANI #103e meeting, the proposal of adopting a downlink grant Downlink control information (DCI) for uplink/downlink beam update was approved.

SUMMARY

In RANI #104bis-e meeting, for support of Multicast Broadcast Service (IVIBS) under R17 release, an important research direction is the design of Control Resource Set (CORESET), one design scheme of which is that a Physical Downlink Control Channel (PDCCH) used for scheduling MBS and a PDCCH used for scheduling unicast can share the given CORESET under certain conditions. However, when a terminal receives MBS traffic and unicast traffic at the same time, and when a downlink grant can update an uplink/downlink beam, whether a Transmission Configuration Indication (TCI) corresponding to a CORESET shared by the MBS and the unicast also needs to be updated will be a problem to be solved.

To address the above problem, the present disclosure provides a solution. It should be noted that although the above description uses massive MIMO and beam-based communication scenarios as examples, the application is also applicable to other scenarios, such as LIE multi-antenna systems, where similar technical effects can be achieved. Additionally, the adoption of a unified solution for various scenarios (including but not limited to massive MIMO, beam-based communications and LTE multi-antenna systems) contributes to the reduction of hardware complexity and costs. If no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

To solve the above problems, the present disclosure discloses a design method and device for transmission of control channel and data channel under MBS scenario. It should be noted that the embodiments in a User Equipment (UE) in the present disclosure and characteristics of the embodiments may be applied to a base station if no conflict is incurred, and vice versa. And the embodiments in the present disclosure and the characteristics in the embodiments can be arbitrarily combined if there is no conflict. Though originally targeted at cellular network, the present disclosure is also applicable to Internet of Things (IoT) and Internet of Vehicles (IoV). Though originally targeted at multi-carrier communications, the present disclosure is also applicable to single-carrier communications. Though originally targeted at multi-antenna communications, the present disclosure is also applicable to single-antenna communications. Besides, the present disclosure is not only targeted at scenarios of terminals and base stations, but also at communication scenarios between terminals and terminals, terminals and relays, Non-Terrestrial Networks as well as relays and base stations, where similar technical effects can be achieved. Additionally, the adoption of a unified solution for various scenarios, including but not limited to communication scenarios between terminals and base stations, contributes to the reduction of hardware complexity and costs.

Further, the embodiments of a first node in the present disclosure and the characteristics of the embodiments may be applied to a second node if no conflict is incurred, and vice versa. Particularly, for interpretations of the terminology, nouns, functions and variants (if not specified) in the present disclosure, refer to definitions given in Technical Specification (TS) 36 series, TS38 series and TS37 series of 3GPP specifications.

The present disclosure provides a method in a first node for wireless communications, comprising:

receiving a first signaling in a first time-frequency resource set, the first signaling being used to indicate a first reference signal resource; and receiving a second signaling in a second time-frequency resource set;

herein, the first time-frequency resource set and the second time-frequency resource set are associated with a candidate resource set, and a first DCI format is a DCI format supported by the candidate resource set; a Cyclic Redundancy Check (CRC) comprised in information transmitted by adopting the first DCI format is scrambled by a first identity (ID); time-domain resources occupied by the second time-frequency resource set are located after time-domain resources occupied by the first time-frequency resource set; a demodulation reference signal of a channel occupied by the second signaling and a target reference signal resource are quasi co-located, and a second DCI format is a DCI format supported by the candidate resource set; whether a CRC comprised in information transmitted by adopting the second DCI format can be scrambled by a second ID is used to determine whether the target reference signal resource is the same as the first reference signal resource; the first ID and the second ID are both non-negative integers, and the first ID is different from the second ID.

In one embodiment, one technical feature of the above method is in: when a CORESET corresponding to the first time-frequency resource set can support a PDCCH scrambled by the first ID used for scheduling unicast and a PDCCH scrambled by the second ID used for scheduling multicast and groupcast, a TCI receiving a PDCCH candidate transmitted in the CORESET cannot be updated by a dynamic signaling, so as to ensure that all terminals that blindly detect the PDCCH in the CORESET have a consistent understanding of adopting what beam to perform a reception.

In one embodiment, another technical feature of the above method is in: when a CORESET corresponding to the first time-frequency resource set only supports a PDCCH scrambled by the first ID used for scheduling unicast, a TCI receiving a PDCCH candidate transmitted in the CORESET can be updated by a dynamic signaling, so as to ensure a rapid and efficient update and maintain the compatibility.

According to one aspect of the present disclosure, comprising:

- receiving a first signal in a third time-frequency resource set, a demodulation reference signal of a channel occupied by the first signal and the first reference signal resource being quasi co-located.

In one embodiment, one technical feature of the above method is in: the first reference signal resource indicated by the first signaling is also used to determine a TCI adopted to receive the first signal scheduled by the first signaling.

According to one aspect of the present disclosure, when a CRC comprised in information transmitted by adopting the second DCI format can be scrambled by the second ID, the target reference signal resource is different from the first reference signal resource; and when a CRC comprised in information transmitted by adopting the second DCI format cannot be scrambled by the second ID, the target reference signal resource is the first reference signal resource.

According to one aspect of the present disclosure, wherein the first ID is used for a unicast transmission, and the second ID is used for a transmission other than a unicast transmission.

According to one aspect of the present disclosure, wherein a CRC comprised in the first signaling is scrambled by the first ID, and the first signaling indicates the first reference signal resource out of a first reference signal resource set; or, a CRC comprised in the first signaling is scrambled by the second ID, and the first signaling indicates the first reference signal resource out of a second reference signal resource set; the first reference signal resource set is different from the second reference signal resource set.

In one embodiment, one technical feature of the above method is in: the first reference signal resource set and the second reference signal resource set respectively correspond to TCI lists configured for unicast as well as multicast and groupcast, and a corresponding TCI being indicated from which TCI list is determined according to a Radio Network Temporary Identifier (RNTI) scrambled by the first signaling scheduling data, so as to enable a more flexible beam management to adapt to different spatial transmission characteristics of different traffic types.

According to one aspect of the present disclosure, comprising:

- receiving a second signal in a fourth time-frequency resource set;
- herein, a demodulation reference signal of a channel occupied by the second signal and a second reference signal resource are quasi co-located; at least a former of an ID scrambling a CRC comprised in the first signaling or an ID scrambling a CRC comprised in the second signaling is related to whether the second reference signal resource is the same as the first reference signal resource.

According to one aspect of the present disclosure, when an ID scrambling a CRC comprised in the first signaling is the same as an ID scrambling a CRC comprised in the second signaling, the second reference signal resource is the first reference signal resource; when an ID scrambling a CRC comprised in the first signaling is different from an ID scrambling a CRC comprised in the second signaling, the second reference signal resource is different from the first reference signal resource.

In one embodiment, one technical feature of the above method is in: only DCIs belonging to a same service type can update a subsequent TCI adopted by a data channel; specifically, a DCI scheduling an MBS transmission can update a subsequent TCI of a PDSCH used for the MBS transmission, and a DCI scheduling a unicast transmission can update a subsequent TCI of a PDSCH used for the unicast transmission.

According to one aspect of the present disclosure, when an ID scrambling a CRC comprised in the first signaling is the second ID, the second reference signal resource is the first reference signal resource; and when an ID scrambling a CRC comprised in the first signaling is the first ID, whether the second reference signal resource is the same as the first reference signal resource is related to an ID scrambling a CRC comprised in the second signaling.

In one embodiment, one technical feature of the above method is in: only a DCI used to schedule an MBS transmission can update a subsequent TCI adopted by a data channel; specifically, a DCI scheduling an MBS transmission can update a subsequent TCI of a PDSCH used for the MBS transmission and a subsequent TCI of a PDSCH used for a unicast transmission, and a DCI scheduling a unicast transmission can only update a subsequent TCI of a PDSCH used for the unicast transmission.

The present disclosure provides a method in a second node for wireless communications, comprising:

- transmitting a first signaling in a first time-frequency resource set, the first signaling being used to indicate a first reference signal resource; and
- transmitting a second signaling in a second time-frequency resource set;
- herein, the first time-frequency resource set and the second time-frequency resource set are associated with a candidate resource set, and a first DCI format is a DCI format supported by the candidate resource set; a CRC comprised in information transmitted by adopting the first DCI format is scrambled by a first ID; time-domain resources occupied by the second time-frequency resource set are located after time-domain resources occupied by the first time-frequency resource set; a demodulation reference signal of a channel occupied by the second signaling and a target reference signal resource are quasi co-located, and a second DCI format is a DCI format supported by the candidate resource set; whether a CRC comprised in information transmitted by adopting the second DCI format can be scrambled by a second ID is used to determine whether the target reference signal resource is the same as the first reference signal resource; the first ID and the second ID are both non-negative integers, and the first ID is different from the second ID.

According to one aspect of the present disclosure, comprising:

transmitting a first signal in a third time-frequency resource set, a demodulation reference signal of a channel occupied by the first signal and the first reference signal resource being quasi co-located.

According to one aspect of the present disclosure, when a CRC comprised in information transmitted by adopting the second DCI format can be scrambled by the second ID, the target reference signal resource is different from the first reference signal resource; and when a CRC comprised in information transmitted by adopting the second DCI format cannot be scrambled by the second ID, the target reference signal resource is the first reference signal resource.

According to one aspect of the present disclosure, wherein the first ID is used for a unicast transmission, and the second ID is used for a transmission other than a unicast transmission.

According to one aspect of the present disclosure, wherein a CRC comprised in the first signaling is scrambled by the first ID, and the first signaling indicates the first reference signal resource out of a first reference signal resource set; or, a CRC comprised in the first signaling is scrambled by the second ID, and the first signaling indicates the first reference signal resource out of a second reference signal resource set; the first reference signal resource set is different from the second reference signal resource set.

According to one aspect of the present disclosure, comprising:

transmitting a second signal in a fourth time-frequency resource set;

herein, a demodulation reference signal of a channel occupied by the second signal and a second reference signal resource are quasi co-located; at least a former of an ID scrambling a CRC comprised in the first signaling or an ID scrambling a CRC comprised in the second signaling is related to whether the second reference signal resource is the same as the first reference signal resource.

According to one aspect of the present disclosure, when an ID scrambling a CRC comprised in the first signaling is the same as an ID scrambling a CRC comprised in the second signaling, the second reference signal resource is the first reference signal resource; when an ID scrambling a CRC comprised in the first signaling is different from an ID scrambling a CRC comprised in the second signaling, the second reference signal resource is different from the first reference signal resource.

According to one aspect of the present disclosure, when an ID scrambling a CRC comprised in the first signaling is the second ID, the second reference signal resource is the first reference signal resource; and when an ID scrambling a CRC comprised in the first signaling is the first ID, whether the second reference signal resource is the same as the first reference signal resource is related to an ID scrambling a CRC comprised in the second signaling.

The present disclosure provides a first node for wireless communications, comprising:

a first receiver, receiving a first signaling in a first time-frequency resource set, the first signaling being used to indicate a first reference signal resource; and a second receiver, receiving a second signaling in a second time-frequency resource set;

herein, the first time-frequency resource set and the second time-frequency resource set are associated with a candidate resource set, and a first DCI format is a DCI format supported by the candidate resource set; a CRC comprised in information transmitted by adopting the first DCI format is scrambled by a first ID; time-domain resources occupied by the second time-frequency resource set are located after time-domain resources occupied by the first time-frequency resource set; a demodulation reference signal of a channel occupied by the second signaling and a target reference signal resource are quasi co-located, and a second DCI format is a DCI format supported by the candidate resource set; whether a CRC comprised in information transmitted by adopting the second DCI format can be scrambled by a second ID is used to determine whether the target reference signal resource is the same as the first reference signal resource; the first ID and the second ID are both non-negative integers, and the first ID is different from the second ID.

The present disclosure provides a second node for wireless communications, comprising:

a first transmitter, transmitting a first signaling in a first time-frequency resource set, the first signaling being used to indicate a first reference signal resource; and a second transmitter, transmitting a second signaling in a second time-frequency resource set;

herein, the first time-frequency resource set and the second time-frequency resource set are associated with a candidate resource set, and a first DCI format is a DCI format supported by the candidate resource set; a CRC comprised in information transmitted by adopting the first DCI format is scrambled by a first ID; time-domain resources occupied by the second time-frequency resource set are located after time-domain resources occupied by the first time-frequency resource set; a demodulation reference signal of a channel occupied by the second signaling and a target reference signal resource are quasi co-located, and a second DCI format is a DCI format supported by the candidate resource set; whether a CRC comprised in information transmitted by adopting the second DCI format can be scrambled by a second ID is used to determine whether the target reference signal resource is the same as the first reference signal resource; the first ID and the second ID are both non-negative integers, and the first ID is different from the second ID.

In one embodiment, the present disclosure has the following advantages over conventional schemes:

when a CORESET corresponding to the first time-frequency resource set can support a PDCCH scrambled by the first ID used for scheduling unicast and a PDCCH scrambled by the second ID used for scheduling multicast and groupcast, a TCI receiving a PDCCH candidate transmitted in the CORESET cannot be updated by a dynamic signaling, so as to ensure that all terminals that blindly detect the PDCCH in the CORESET have a consistent understanding of adopting what beam to perform a reception; when a CORESET corresponding to the first time-frequency resource set only supports the PDCCH scrambled by the first ID used for scheduling unicast, a TCI receiving a PDCCH candidate transmitted in the CORESET can be updated by a dynamic signaling, so as to ensure a rapid and efficient update and maintain the compatibility;

different TCI lists are configured for unicast as well as multicast and groupcast, and a corresponding TCI is indicated specifically out of which TCI list is determined according to a scrambling method of a PDCCH scheduling data, which enables a more flexible beam management to adapt to different spatial transmission characteristics for different traffic types;

only DCIs belonging to a same service type can update a subsequent TCI adopted by a data channel, so as to ensure that a terminal and a base station have a consistent understanding in how to update the TCI;

only a DCI used for scheduling an MBS transmission can update a subsequent TCI adopted by a data channel to ensure that all terminals in an MBS receiving state adopt a unified TCI for data reception, so as to ensure the performance of MBS.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
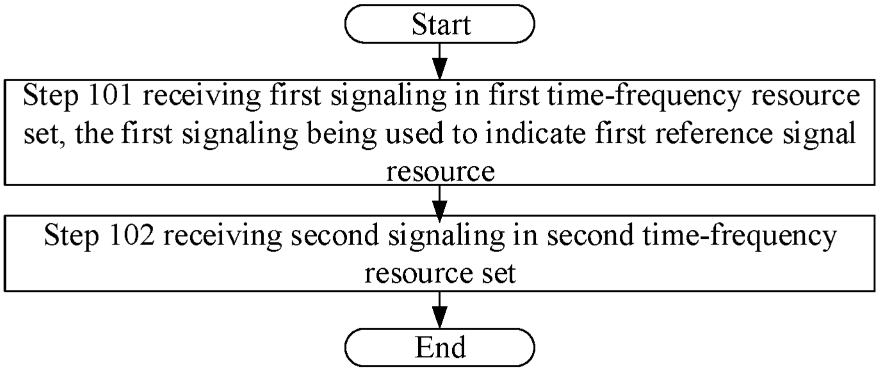
FIG. 1 illustrates a flowchart of the processing of a first node according to one embodiment of the present disclosure.

Embodiment 1 illustrates a processing flowchart of a first node, as shown in FIG. 1. In step 100 illustrated by FIG. 1, each box represents a step. In embodiment 1, a first node in the present disclosure receives a first signaling in a first time-frequency resource set in step 101, and the first signaling is used to indicate a first reference signal resource; in step 102, receives a second signaling in a second time-frequency resource set.

In embodiment 1, the first time-frequency resource set and the second time-frequency resource set are associated with a candidate resource set, and a first DCI format is a DCI format supported by the candidate resource set; a CRC comprised in information transmitted by adopting the first DCI format is scrambled by a first ID; time-domain resources occupied by the second time-frequency resource set are located after time-domain resources occupied by the first time-frequency resource set; a demodulation reference signal of a channel occupied by the second signaling and a target reference signal resource are quasi co-located, and a second DCI format is a DCI format supported by the candidate resource set; whether a CRC comprised in information transmitted by adopting the second DCI format can be scrambled by a second ID is used to determine whether the target reference signal resource is the same as the first reference signal resource; the first ID and the second ID are both non-negative integers, and the first ID is different from the second ID.

In one embodiment, the first time-frequency resource set occupies at least one Orthogonal Frequency Division Multiplexing (OFDM) symbol in time domain, and the first time-frequency resource set occupies frequency-domain resources corresponding to at least one RB in frequency domain.

In one embodiment, the first time-frequency resource set occupies more than one Resource Element (RE).

In one embodiment, the first time-frequency resource set is(are) RE(s) occupied by a PDCCH candidate.

In one embodiment, frequency-domain resources occupied by the first time-frequency resource set are frequency-domain resources occupied by a CORESET.

In one embodiment, time-domain resource occupied by the first time-frequency resource set are time-domain resource occupied by a CORESET.

In one embodiment, time-domain resources occupied by the first time-frequency resource set are time-domain resources occupied by a search space.

In one embodiment, time-domain resources occupied by the first time-frequency resource set are time-domain resources occupied by a search space set.

In one embodiment, the first time-frequency resource set comprises a CORESET.

In one embodiment, the first time-frequency resource set comprises a CORESET pool.

In one embodiment, the first time-frequency resource set comprises a search space set.

In one embodiment, the second time-frequency resource set occupies at least one OFDM symbol in time domain, and the second time-frequency resource set occupies frequency-domain resources corresponding to at least one RB in frequency domain.

In one embodiment, the second time-frequency resource set is an RE occupied by a PDCCH candidate.

In one embodiment, the second time-frequency resource set occupies more than one RE.

In one embodiment, frequency-domain resources occupied by the second time-frequency resource set are frequency-domain resources occupied by a CORESET.

In one embodiment, time-domain resource occupied by the second time-frequency resource set are time-domain resource occupied by a CORESET.

In one embodiment, time-domain resources occupied by the second time-frequency resource set are time-domain resources occupied by a search space.

In one embodiment, time-domain resources occupied by the second time-frequency resource set are time-domain resources occupied by a search space set.

In one embodiment, the second time-frequency resource set comprises a CORESET.

In one embodiment, the second time-frequency resource set comprises a CORESET Pool.

In one embodiment, the second time-frequency resource set comprises a search space set.

In one embodiment, the first signaling comprises a DCI.

In one embodiment, a physical-layer channel occupied by the first signaling comprises a PDCCH.

In one embodiment, the first signaling is a Downlink Grant.

In one embodiment, the first reference signal resource comprises a Channel-State Information Reference Signal (CSI-RS) resource.

In one embodiment, the first reference signal resource comprises a Demodulation Reference Signal (DMRS) resource.

In one embodiment, the first reference signal resource comprises a Sounding Reference Signal (SRS) resource.

In one embodiment, the first reference signal resource comprises an SS/PBCH Block (SSB).

In one embodiment, the first reference signal resource corresponds to a TCI.

In one embodiment, the first reference signal resource corresponds to a TCI-State.

In one embodiment, the first reference signal resource corresponds to a TCI-StateId.

In one embodiment, the target reference signal resource comprises a CSI-RS resource.

In one embodiment, the target reference signal resource comprises a DMRS resource.

In one embodiment, the target reference signal resource comprises an SRS resource.

In one embodiment, the target reference signal resource comprises an SSB.

In one embodiment, the target reference signal resource corresponds to a TCI.

In one embodiment, the target reference signal resource corresponds to a TCI-State.

In one embodiment, the target reference signal resource corresponds to a TCI-StateId.

In one embodiment, the second signaling comprises a DCI.

In one embodiment, a physical-layer channel occupied by the second signaling comprises a PDCCH.

In one embodiment, the second signaling is a downlink grant.

In one embodiment, the candidate resource set comprises a CORESET.

In one embodiment, the candidate resource set comprises a search space.

In one embodiment, the candidate resource set comprises a search space set.

In one embodiment, the candidate resource set corresponds to a ControlResourceSetId.

In one embodiment, the second resource set corresponds to a SearchSpaceId.

In one embodiment, the meaning of the phrase of the first time-frequency resource set and the second time-frequency resource set being associated with a candidate resource set includes: frequency-domain resources occupied by the first time-frequency resource set and frequency-domain resources occupied by the second time-frequency resource set are the same as frequency-domain resources occupied by the candidate resource set.

In one embodiment, the meaning of the phrase of the first time-frequency resource set and the second time-frequency resource set being associated with a candidate resource set includes: frequency-domain resources occupied by the first time-frequency resource set and frequency-domain resources occupied by the second time-frequency resource set belong to frequency-domain resources occupied by the candidate resource set.

In one embodiment, the meaning of the phrase of the first time-frequency resource set and the second time-frequency resource set being associated with a candidate resource set includes: time-domain resources occupied by the first time-frequency resource set and time-domain resources occupied by the second time-frequency resource set are the same as time-domain resources occupied by the candidate resource set.

In one embodiment, the meaning of the phrase of the first time-frequency resource set and the second time-frequency resource set being associated with a candidate resource set includes: time-domain resources occupied by the first time-frequency resource set and time-domain resources occupied by the second time-frequency resource set belong to time-domain resources occupied by the candidate resource set.

In one embodiment, the first DCI format is DCI format 0_0.

In one embodiment, the first DCI format is DCI format 0_1.

In one embodiment, the first DCI format is DCI format 0_2.

In one embodiment, the first DCI format is DCI format 1_0.

In one embodiment, the first DCI format is DCI format 1_1.

In one embodiment, the first DCI format is DCI format 1_2.

In one embodiment, the first DCI format is DCI format 2_0.

In one embodiment, the first DCI format is DCI format 2_1.

In one embodiment, the first DCI format is DCI format 2_2.

In one embodiment, the first DCI format is DCI format 2_3.

In one embodiment, the first DCI format is DCI format 2_4.

In one embodiment, the first DCI format is DCI format 2_5.

In one embodiment, the first DCI format is DCI format 2_6.

In one embodiment, the first DCI format is DCI format 3_0.

In one embodiment, the first DCI format is DCI format 3_1.

In one embodiment, the meaning of the above phrase of a first DCI format being a DCI format supported by the candidate resource set includes: the candidate resource set is a CORESET, the CORESET is associated with a search space set, a DCI transmitted in a PDCCH Candidate comprised in the search space set supports the first DCI format.

In one embodiment, the meaning of the above phrase of a first DCI format being a DCI format supported by the candidate resource set includes: the candidate resource set is a search space set, and a DCI transmitted in a PDCCH Candidate comprised in the search space set supports the first DCI format.

In one embodiment, the meaning of the above phrase of a first DCI format being a DCI format supported by the candidate resource set includes: frequency-domain resources occupied by the candidate resource set belongs to a CORESET, the CORESET is associated with a search space set, a DCI transmitted in a PDCCH Candidate comprised in the search space set supports the first DCI format.

In one embodiment, the meaning of the above phrase of a first DCI format being a DCI format supported by the candidate resource set includes: time-domain resources occupied by the candidate resource set belongs to a search space set, and a DCI transmitted in a PDCCH Candidate comprised in the search space set supports the first DCI format.

In one embodiment, the information transmitted by adopting the first DCI format comprises a DCI.

In one embodiment, the information transmitted by adopting the first DCI format comprises a PDCCH.

In one embodiment, the information transmitted by adopting the first DCI format comprises a downlink scheduling.

In one embodiment, the first ID is an RNTI.

In one embodiment, the first ID is a Cell RNTI (C-RNTI).

In one embodiment, the first ID is a Configured Scheduling RNTI (CS-RNTI).

In one embodiment, the first ID is a Modulation Coding Scheme Cell RNTI (MCS-C-RNTI).

In one embodiment, the first ID is a Semi-Persistent Channel-State Information RNTI (SP-CSI-RNTI).

In one embodiment, the first ID is a Sidelink RNTI (SL-RNTI).

In one embodiment, the first ID is a Sidelink Configured Scheduling RNTI (SL-CS-RNTI).

In one embodiment, a type of quasi co-location between a demodulation reference signal occupied by the second signaling and the target reference signal resource is Quasi Co-located (QCL) Type D.

In one embodiment, a type of quasi co-location between a demodulation reference signal occupied by the second signal and the target reference signal resource is QCL Type A.

In one embodiment, a type of quasi co-location between a demodulation reference signal occupied by the second signal and the target reference signal resource is QCL Type B.

In one embodiment, a type of quasi co-location between a demodulation reference signal occupied by the second signal and the target reference signal resource is QCL Type C.

In one embodiment, the second DCI format is DCI format 0_0.

In one embodiment, the second DCI format is DCI format 0_1.

In one embodiment, the second DCI format is DCI format 0_2.

In one embodiment, the second DCI format is DCI format 1_0.

In one embodiment, the second DCI format is DCI format 1_1.

In one embodiment, the second DCI format is DCI format 1_2.

In one embodiment, the second DCI format is DCI format 2_0.

In one embodiment, the second DCI format is DCI format 2_1.

In one embodiment, the second DCI format is DCI format 2_2.

In one embodiment, the second DCI format is DCI format 2_3.

In one embodiment, the second DCI format is DCI format 2_4.

In one embodiment, the second DCI format is DCI format 2_5.

In one embodiment, the second DCI format is DCI format 2_6.

In one embodiment, the second DCI format is DCI format 3_0.

In one embodiment, the second DCI format is DCI format 3_1.

In one embodiment, the meaning of the above phrase of a second DCI format being a DCI format supported by the candidate resource set includes: the candidate resource set is a CORESET, the CORESET is associated with a search space set, a DCI transmitted in a PDCCH Candidate comprised in the search space set supports the second DCI format.

In one embodiment, the meaning of the above phrase of a second DCI format being a DCI format supported by the candidate resource set includes: the candidate resource set is a search space set, and a DCI transmitted in a PDCCH Candidate comprised in the search space set supports the second DCI format.

In one embodiment, the meaning of the above phrase of a second DCI format being a DCI format supported by the candidate resource set includes: frequency-domain resources occupied by the candidate resource set belong to a CORESET, the CORESET is associated with a search space set, a DCI transmitted in a PDCCH Candidate comprised in the search space set supports the second DCI format.

In one embodiment, the meaning of the above phrase of a second DCI format being a DCI format supported by the candidate resource set includes: time-domain resources occupied by the candidate resource set belong a search space set, and a DCI transmitted in a PDCCH Candidate comprised in the search space set supports the second DCI format.

In one embodiment, the information transmitted by adopting the second DCI format comprises a DCI.

In one embodiment, the information transmitted by adopting the second DCI format comprises a PDCCH.

In one embodiment, the information transmitted by adopting the second DCI format comprises a downlink scheduling.

In one embodiment, the first DCI format is the same as the second DCI format.

In one embodiment, the first DCI format is different from the second DCI format.

In one embodiment, the candidate resource set only supports a given DCI format, and the first DCI format and the second DCI format are both the given DCI format.

In one embodiment, the candidate resource set only supports the first DCI format and the second DCI format, and the first DCI format is different from the second DCI format.

In one embodiment, the candidate resource set supports a third DCI format other than the first DCI format and the second DCI format, and the third DCI format is different from both the first DCI format and the second DCI format.

In one embodiment, the second ID is an RNTI.

In one embodiment, the second ID is an RNTI other than a C-RNTI.

In one embodiment, the second ID is a Group Radio Network Temporary Identifier (G-RNTI).

In one embodiment, the second ID is a Group Common Radio Network Temporary Identifier (GC-RNTI).

In one embodiment, the second ID is a Single Carrier Radio Network Temporary Identifier (SC-RNTI).

In one embodiment, the second ID is a Single Carrier Point to Multipoint Radio Network Temporary Identifier (SC-PTM-RNTI).

In one embodiment, the second ID is a Single Carrier Single Frequency Network Radio Network Temporary Identifier (SC-SFN-RNTI).

Embodiment 2

Figure 2:
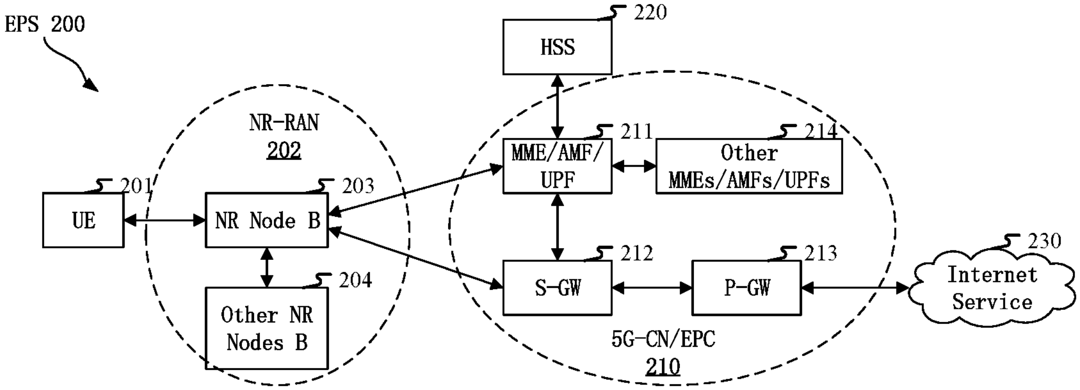
FIG. 2 illustrates a schematic diagram of a network architecture according to one embodiment of the present disclosure.

Embodiment 2 illustrates a schematic diagram of a network architecture, as shown in FIG. 2.

FIG. 2 illustrates a network architecture 200 of 5G NR, Long-Term Evolution (LTE) and Long-Term Evolution Advanced (LTE-A) systems. The NR 5G or LIE network architecture 200 may be called an Evolved Packet System (EPS) 200 or other appropriate terms. The EPS 200 may comprise UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services or other cellular networks. The NG-RAN 202 comprises an NR node B (gNB) 203 and other gNBs 204. The gNB 203 provides UE 201—oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 201 can receive PDCCHs from a plurality of TRPs at the same time.

In one embodiment, the UE 201 can receive CSI-RSs from a plurality of TRPs at the same time.

In one embodiment, the UE 201 can receive SSBs from a plurality of TRPs at the same time.

In one embodiment, the UE 201 is a terminal capable of monitoring a plurality of beams at the same time.

In one embodiment, the UE 201 is a terminal supporting Massive-MIMO.

In one embodiment, the UE 201 is a terminal supporting Vehicle-to-Everything (V2X).

In one embodiment, the UE 201 supports transmission of SC-PTM.

In one embodiment, the UE 201 supports transmitting multicast and groupcast services through a unicast channel.

In one embodiment, the UE 201 supports retransmitting multicast and groupcast data through a unicast channel.

In one embodiment, the UE 201 supports MBS services.

In one embodiment, the gNB 203 corresponds to the second node in the present disclosure.

In one embodiment, the gNB 203 can simultaneously transmit PDCCHs from a plurality of TRPs.

In one embodiment, a plurality of TRPs comprised in the gNB 203 can transmit CSI-RSs at the same time.

In one embodiment, a plurality of TRPs comprised in the gNB 203 can transmit SSBs at the same time.

In one embodiment, the gNB 203 supports a transmission of multi-beam.

In one embodiment, the gNB 203 supports a transmission based on Massive-MIMO.

In one embodiment, the gNB 203 comprises at least two TRPs.

In one embodiment, at least two TRPs comprised in the gNB 203 are connected through an ideal backhaul In one embodiment, the UE 201 supports transmission of Point-To-Multipoint (PTM).

In one embodiment, the gNB 203 corresponds to the second node in the present disclosure.

In one embodiment, the gNB 203 is a base station capable of supporting multicast and groupcast services.

In one embodiment, the gNB 203 supports transmission of PTM.

In one embodiment, the gNB 203 supports transmission of SC-PTM.

In one embodiment, the gNB 203 supports transmitting multicast and groupcast services through a unicast channel.

In one embodiment, the gNB 203 supports retransmitting multicast and groupcast data through a unicast channel.

In one embodiment, the gNB 203 supports MBS services.

Embodiment 3

Figure 3:
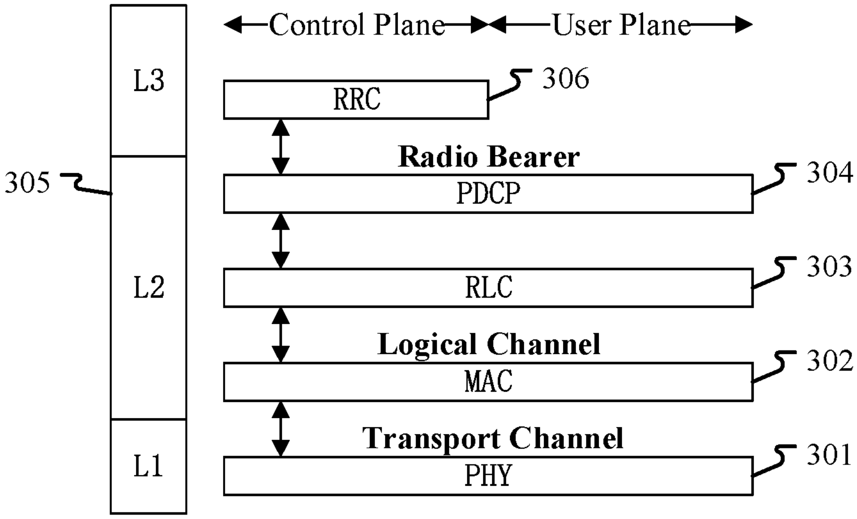
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first communication node and the second communication node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and also provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP 304 of the second communication node is used to generate scheduling of the first communication node.

In one embodiment, the PDCP 354 of the second communication node is used to generate scheduling of the first communication node.

In one embodiment, the first signaling is generated by the PHY 301 or the PHY 351.

In one embodiment, the first signaling is generated by the MAC 302 or the MAC 352.

In one embodiment, the second signaling is generated by the PHY 301 or the PHY 351.

In one embodiment, the second signaling is generated by the MAC 302 or the MAC 352.

In one embodiment, the first signal is generated by the PHY 301 or the PHY 351.

In one embodiment, the first signal is generated by the MAC 302 or the MAC 352.

In one embodiment, the first signal is generated by the RRC 306.

In one embodiment, the second signal is generated by the PHY 301 or the PHY 351.

In one embodiment, the second signal is generated by the MAC 302 or the MAC 352.

In one embodiment, the second signal is generated by the RRC 306.

In one embodiment, the first node is a terminal.

In one embodiment, the second node is a terminal.

In one embodiment, the second node is a Road Side Unit (RSU).

In one embodiment, the second node is a Grouphead.

In one embodiment, the second node is a Transmitter Receiver Point (TRP).

In one embodiment, the second node is a cell.

In one embodiment, the second node is an eNB.

In one embodiment, the second node is a base station.

In one embodiment, the second node is used to manage a plurality of TRPs.

In one embodiment, the second node is a node used for managing a plurality of cells.

In one embodiment, the second node is a Multicell/Multicast Coordination Entity (MCE).

Embodiment 4

Figure 4:
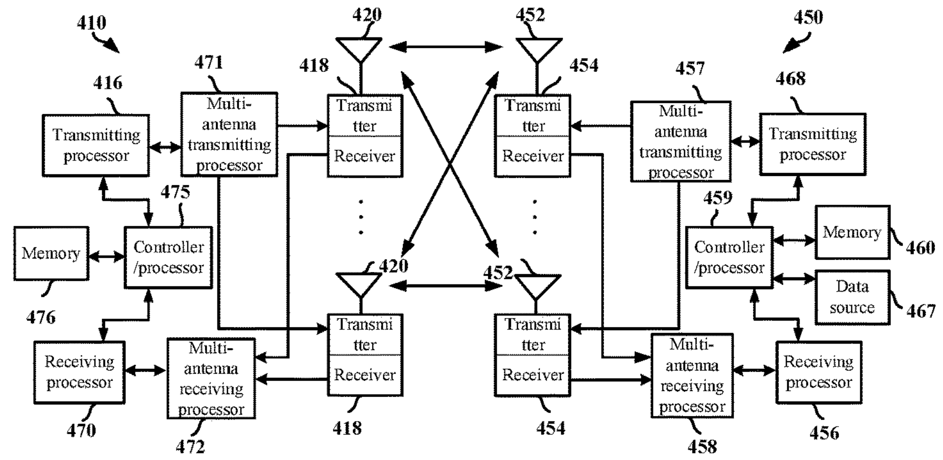
FIG. 4 illustrates a schematic diagram of a first communication device and a second communication device according to one embodiment of the present disclosure.

Embodiment 4 illustrates a schematic diagram of a first communication device and a second communication device in the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least first receives a first signaling in a first time-frequency resource set, the first signaling is used to indicate a first reference signal resource; then receives a second signaling in a second time-frequency resource set; the first time-frequency resource set and the second time-frequency resource set are associated with a candidate resource set, and a first DCI format is a DCI format supported by the candidate resource set; a CRC comprised in information transmitted by adopting the first DCI format is scrambled by a first ID; time-domain resources occupied by the second time-frequency resource set are located after time-domain resources occupied by the first time-frequency resource set; a demodulation reference signal of a channel occupied by the second signaling and a target reference signal resource are quasi co-located, and a second DCI format is a DCI format supported by the candidate resource set; whether a CRC comprised in information transmitted by adopting the second DCI format can be scrambled by a second ID is used to determine whether the target reference signal resource is the same as the first reference signal resource; the first ID and the second ID are both non-negative integers, and the first ID is different from the second ID.

In one embodiment, the first communication device 450 comprises at least one processor and at least one memory. a memory that stores a computer readable instruction program. The computer readable instruction program generates an action when executed by at least one processor. The action includes: first receiving a first signaling in a first time-frequency resource set, the first signaling being used to indicate a first reference signal resource; then receiving a second signaling in a second time-frequency resource set; the first time-frequency resource set and the second time-frequency resource set are associated with a candidate resource set, and a first DCI format is a DCI format supported by the candidate resource set; a CRC comprised in information transmitted by adopting the first DCI format is scrambled by a first ID; time-domain resources occupied by the second time-frequency resource set are located after time-domain resources occupied by the first time-frequency resource set; a demodulation reference signal of a channel occupied by the second signaling and a target reference signal resource are quasi co-located, and a second DCI format is a DCI format supported by the candidate resource set; whether a CRC comprised in information transmitted by adopting the second DCI format can be scrambled by a second ID is used to determine whether the target reference signal resource is the same as the first reference signal resource; the first ID and the second ID are both non-negative integers, and the first ID is different from the second ID.

In one embodiment, the second communication device 410 comprises at least one processor and at least one memory. The at least one memory comprises computer program codes; the at least one memory and the computer program codes are configured to be used in collaboration with the at least one processor. The second communication device 410 at least first transmits a first signaling in a first time-frequency resource set, the first signaling is used to indicate a first reference signal resource; then transmits a second signaling in a second time-frequency resource set; the first time-frequency resource set and the second time-frequency resource set are associated with a candidate resource set, and a first DCI format is a DCI format supported by the candidate resource set; a CRC comprised in information transmitted by adopting the first DCI format is scrambled by a first ID; time-domain resources occupied by the second time-frequency resource set are located after time-domain resources occupied by the first time-frequency resource set; a demodulation reference signal of a channel occupied by the second signaling and a target reference signal resource are quasi co-located, and a second DCI format is a DCI format supported by the candidate resource set; whether a CRC comprised in information transmitted by adopting the second DCI format can be scrambled by a second ID is used to determine whether the target reference signal resource is the same as the first reference signal resource; the first ID and the second ID are both non-negative integers, and the first ID is different from the second ID.

In one embodiment, the second communication device 410 comprises a memory that stores a computer readable instruction program. The computer readable instruction program generates an action when executed by at least one processor. The action includes: first transmitting a first signaling in a first time-frequency resource set, the first signaling being used to indicate a first reference signal resource; then transmitting a second signaling in a second time-frequency resource set; the first time-frequency resource set and the second time-frequency resource set are associated with a candidate resource set, and a first DCI format is a DCI format supported by the candidate resource set; a CRC comprised in information transmitted by adopting the first DCI format is scrambled by a first ID; time-domain resources occupied by the second time-frequency resource set are located after time-domain resources occupied by the first time-frequency resource set; a demodulation reference signal of a channel occupied by the second signaling and a target reference signal resource are quasi co-located, and a second DCI format is a DCI format supported by the candidate resource set; whether a CRC comprised in information transmitted by adopting the second DCI format can be scrambled by a second ID is used to determine whether the target reference signal resource is the same as the first reference signal resource; the first ID and the second ID are both non-negative integers, and the first ID is different from the second ID.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the first communication device 450 is a terminal.

In one embodiment, the second communication device 410 is a base station.

In one embodiment, the second communication device 410 is a UE.

In one embodiment, the second communication device 410 is a network device.

In one embodiment, the second communication device 410 is a serving cell.

In one embodiment, the second communication device 410 is a TRP.

In one embodiment, at least first four of the antenna 452, the receiver 454, the multi-antenna receiving processor 458, the receiving processor 456 and the controller/processor 459 are used to receive a first signaling in a first time-frequency resource set, and the first signaling is used to indicate a first reference signal resource; and at least first four of the antenna 420, the transmitter 418, the multi-antenna transmitting processor 471, the transmitting processor 416 and the controller/processor 475 are used to transmit a first signaling in a first time-frequency resource set, and the first signaling is used to indicate a first reference signal resource.

In one embodiment, at least first four of the antenna 452, the receiver 454, the multi-antenna receiving processor 458, the receiving processor 456 and the controller/processor 459 are used to receive a second signaling in a second time-frequency resource set; and at least first four of the antenna 420, the transmitter 418, the multi-antenna transmitting processor 471, the transmitting processor 416 and the controller/processor 475 are used to transmit a second signaling in a second candidate resource set.

In one embodiment, at least first four of the antenna 452, the receiver 454, the multi-antenna receiving processor 458, the receiving processor 456 and the controller/processor 459 are used to receive a first signal in a third time-frequency resource set; and at least first four of the antenna 420, the transmitter 418, the multi-antenna transmitting processor 471, the transmitting processor 416 and the controller/processor 475 are used to transmit a first signal in a third time-frequency resource set.

In one embodiment, at least first four of the antenna 452, the receiver 454, the multi-antenna receiving processor 458, the receiving processor 456 and the controller/processor 459 are used to receive a second signal in a fourth time-frequency resource set; and at least first four of the antenna 420, the transmitter 418, the multi-antenna transmitting processor 471, the transmitting processor 416 and the controller/processor 475 are used to transmit a second signal in a fourth time-frequency resource set.

Embodiment 5

Figure 5:
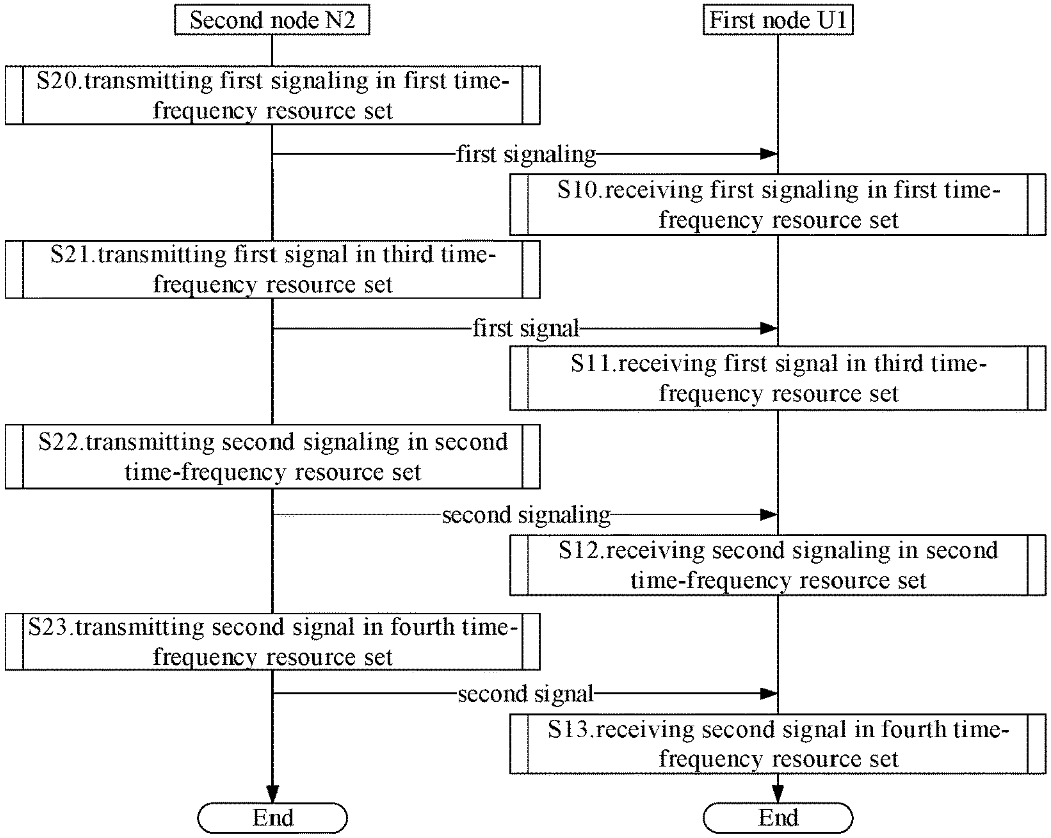
FIG. 5 illustrates a flowchart of a first signaling according to one embodiment of the present disclosure.

Embodiment 5 illustrates a flowchart of a first signaling, as shown in FIG. 5. In FIG. 5, a first node U1 and a second node N2 are in communications via a radio link. It is particularly underlined that the order illustrated in the embodiment does not put constraints over sequences of signal transmissions and implementations.

The first node U1 receives a first signaling in a first time-frequency resource set in step S10; receives a first signal in a third time-frequency resource set in step S11; receives a second signaling in a second time-frequency resource set in step S12; and receives a second signal in a fourth time-frequency resource set in step S13.

The second node N2 transmits a first signaling in a first time-frequency resource set in step S20; transmits a first signal in a third time-frequency resource set in step S21; transmits a second signaling in a second time-frequency resource set in step S22; and transmits a second signal in a fourth time-frequency resource set in step S23.

In embodiment 5, the first signaling is used to indicate a first reference signal resource; the first time-frequency resource set and the second time-frequency resource set are associated with a candidate resource set, and a first DCI format is a DCI format supported by the candidate resource set; a CRC comprised in information transmitted by adopting the first DCI format is scrambled by a first ID; time-domain resources occupied by the second time-frequency resource set are located after time-domain resources occupied by the first time-frequency resource set; a demodulation reference signal of a channel occupied by the second signaling and a target reference signal resource are quasi co-located, and a second DCI format is a DCI format supported by the candidate resource set; whether a CRC comprised in information transmitted by adopting the second DCI format can be scrambled by a second ID is used to determine whether the target reference signal resource is the same as the first reference signal resource; the first ID and the second ID are both non-negative integers, and the first ID is different from the second ID; a demodulation reference signal of a channel occupied by the first signal and the first reference signal resource are quasi co-located; a demodulation reference signal of a channel occupied by the second signal and a second reference signal resource are quasi co-located; at least a former of an ID scrambling a CRC comprised in the first signaling or an ID scrambling a CRC comprised in the second signaling is related to whether the second reference signal resource is the same as the first reference signal resource.

In one embodiment, the third time-frequency resource set comprises more than one RE.

In one embodiment, the first signaling is used to indicate the third time-frequency resource set.

In one embodiment, the first signaling is used to indicate a Modulation and Coding Scheme (MCS) adopted by the first signal.

In one embodiment, the first signaling is used to indicate a HARQ process number of the first signal.

In one embodiment, the first signaling is used to indicate a Redundancy Version (RV) adopted by the first signal.

In one embodiment, the first signal is generated by a Transport Block (TB).

In one embodiment, the first signal is generated by a Code Block (CB).

In one embodiment, the first signal is generated by a Code Block Group (CBG).

In one embodiment, a physical-layer channel occupied by the first signal is a Physical Downlink Shared Channel (PDSCH).

In one embodiment, a transport channel occupied by the first signal is a Downlink Shared Channel (DL-SCH).

In one embodiment, a type of quasi co-location between a demodulation reference signal of a channel occupied by the first signal and the first reference signal resource is at least one of QCL Type D, QCL Type A, QCL Type B or QCL Type C.

In one embodiment, a TCI field in the first signaling is used to indicate the first reference signal resource.

In one embodiment, the first signaling is used to schedule the first signal.

In one embodiment, the first signal is a radio signal.

In one embodiment, the first signal is a baseband signal.

In one embodiment, when a CRC comprised in information transmitted by adopting the second DCI format can be scrambled by the second ID, the target reference signal resource is different from the first reference signal resource; and when a CRC comprised in information transmitted by adopting the second DCI format cannot be scrambled by the second ID, the target reference signal resource is the first reference signal resource.

In one subembodiment of the embodiment, the meaning of the above phrase of the target reference signal resource being different from the first reference signal resource includes: a radio signal transmitted in the target reference signal resource and a radio signal transmitted in the first reference signal resource are non-QCL.

In one subembodiment of the embodiment, the meaning of the above phrase of the target reference signal resource being different from the first reference signal resource includes: the target reference signal resource and the first reference signal resource respectively correspond to two different TCI-States.

In one subembodiment of the embodiment, the meaning of the above phrase of the target reference signal resource being different from the first reference signal resource includes: the target reference signal resource and the first reference signal resource respectively correspond to two different TCI-StateIds.

In one subembodiment of the embodiment, the meaning of the above phrase of the target reference signal resource being the first reference signal resource includes: a radio signal transmitted in the target reference signal resource and a radio signal transmitted in the first reference signal resource are QCL.

In one subembodiment of the embodiment, the meaning of the above phrase of the target reference signal resource being the first reference signal resource includes: the target reference signal resource and the first reference signal resource respectively correspond to a same TCI-State.

In one subembodiment of the embodiment, the meaning of the above phrase of the target reference signal resource being the first reference signal resource includes: the target reference signal resource and the first reference signal resource respectively correspond to a same TCI-StateId.

In one subembodiment of the embodiment, the meaning of the above phrase of the target reference signal resource being the first reference signal resource includes: the target reference signal resource and the first reference signal resource corresponds to a same CSI-RS resource.

In one subembodiment of the embodiment, the meaning of the above phrase of the target reference signal resource being the first reference signal resource includes: the target reference signal resource and the first reference signal resource corresponds to a same SSB.

In one subembodiment of the embodiment, when the target reference signal resource is different from the first reference signal resource, the target reference signal resource is pre-defined.

In one subembodiment of the embodiment, when the target reference signal resource is different from the first reference signal resource, the target reference signal resource is pre-defined.

In one subsidiary embodiment of the subembodiment, the target reference signal resource is configured through an RRC signaling.

In one subsidiary embodiment of the subembodiment, the target reference signal resource comprises an SSB.

In one subembodiment of the embodiment, when the target reference signal resource is different from the first reference signal resource, the target reference signal resource is default.

In one subembodiment of the embodiment, when the target reference signal resource is different from the first reference signal resource, the target reference signal resource indicated through a MAC CE.

In one subembodiment of the embodiment, when the target reference signal resource is different from the first reference signal resource, the target reference signal resource cannot be dynamically indicated by a PDCCH.

In one embodiment, the first ID is used for a unicast transmission, and the second ID is used for a transmission other than a unicast transmission.

In one subembodiment of the embodiment, the meaning of the above phrase of the first ID being used for a unicast transmission includes: the first ID is used to schedule a scrambling of a CRC comprised in a PDCCH of data adopting a unicast transmission.

In one subembodiment of the embodiment, the meaning of the above phrase of the first ID being used for a unicast transmission includes: the first ID is used for a scrambling of a CRC of a PDSCH of data adopting a unicast transmission.

In one subembodiment of the embodiment, the meaning of the above phrase of the first ID being used for a unicast transmission includes: the first ID is UE-specific.

In one subembodiment of the embodiment, the meaning of the above phrase of the first ID being used for a unicast transmission includes: the first ID is configured to the first node in a serving cell where the first node is located, and will not be configured to a terminal other than the first node.

In one subembodiment of the embodiment, the meaning of the above phrase of the second ID being used for a transmission other than a unicast transmission includes: the second ID is used for a broadcast transmission.

In one subembodiment of the embodiment, the meaning of the above phrase of the second ID being used for a transmission other than a unicast transmission includes: the second ID is used for a groupcast transmission.

In one subembodiment of the embodiment, the meaning of the above phrase of the second ID being used for a transmission other than a unicast transmission includes: the second ID is used for a multicast transmission.

In one subembodiment of the embodiment, the meaning of the above phrase of the second ID being used for a transmission other than a unicast transmission includes: the second ID is used to schedule a scrambling of a CRC comprised in a PDCCH of data adopting a broadcast transmission.

In one subembodiment of the embodiment, the meaning of the above phrase of the second ID being used for a transmission other than a unicast transmission includes: the second ID is used to schedule a scrambling of a CRC comprised in a PDCCH of data adopting a groupcast transmission.

In one subembodiment of the embodiment, the meaning of the above phrase of the second ID being used for a transmission other than a unicast transmission includes: the second ID is used to schedule a scrambling of a CRC comprised in a PDCCH of data adopting a multicast transmission.

In one subembodiment of the embodiment, the meaning of the above phrase of the second ID being used for a transmission other than a unicast transmission includes: the second ID is used for a scrambling of a CRC comprised in data adopting a broadcast transmission.

In one subembodiment of the embodiment, the meaning of the above phrase of the second ID being used for a transmission other than a unicast transmission includes: the second ID is used for a scrambling of a CRC comprised in data adopting a groupcast transmission.

In one subembodiment of the embodiment, the meaning of the above phrase of the second ID being used for a transmission other than a unicast transmission includes: the second ID is used for a scrambling of a CRC comprised in data adopting a multicast transmission.

In one subembodiment of the embodiment, the meaning of the above phrase of the second ID being used for a transmission other than a unicast transmission includes: the second ID is fixed.

In one subembodiment of the embodiment, the meaning of the above phrase of the second ID being used for a transmission other than a unicast transmission includes: the second ID is shared by a plurality of terminals.

In one subembodiment of the embodiment, the meaning of the above phrase of the second ID being used for a transmission other than a unicast transmission includes: the second ID is shared by terminal groups.

In one subembodiment of the embodiment, the meaning of the above phrase of the second ID being used for a transmission other than a unicast transmission includes: the second ID is used for a scrambling of a CRC comprised in given data, and a logical channel occupied by the given data comprises a Multicast Traffic Channel (MTCH).

In one subembodiment of the embodiment, the meaning of the above phrase of the second ID being used for a transmission other than a unicast transmission includes: the second ID is used for scrambling of a CRC comprised in given data, and a logical channel occupied by the given data comprises a Multicast Control Channel (MCCH).

In one embodiment, a CRC comprised in the first signaling is scrambled by the first ID, and the first signaling indicates the first reference signal resource out of a first reference signal resource set; or, a CRC comprised in the first signaling is scrambled by the second ID, and the first signaling indicates the first reference signal resource out of a second reference signal resource set; the first reference signal resource set is different from the second reference signal resource set.

In one subembodiment of the embodiment, the first reference signal resource set is used for a unicast transmission.

In one subembodiment of the embodiment, the second reference signal resource set is used for a transmission other than a unicast transmission.

In one subembodiment of the embodiment, the second reference signal resource set is used for a multicast and groupcast transmission.

In one subembodiment of the embodiment, the second reference signal resource set is used for a broadcast transmission.

In one subembodiment of the embodiment, the first reference signal resource set comprises M1 reference signal resource(s), M1 being a positive integer.

In one subsidiary embodiment of the subembodiment, M is equal to 1.

In one subsidiary embodiment of the subembodiment, M is greater than 1.

In one subsidiary embodiment of the subembodiment, any of the M1 reference signal resource(s) comprises a CSI-RS resource.

In one subsidiary embodiment of the subembodiment, any of the M1 reference signal resource(s) comprises a DMRS resource.

In one subsidiary embodiment of the subembodiment, any of the M1 reference signal resource(s) comprises an SRS resource.

In one subsidiary embodiment of the subembodiment, any of the M1 reference signal resource(s) comprises an SSB.

In one subsidiary embodiment of the subembodiment, any of the M1 reference signal resource(s) corresponds to a TCI.

In one subsidiary embodiment of the subembodiment, any of the M1 reference signal resource(s) corresponds to a TCI-State.

In one subsidiary embodiment of the subembodiment, any of the M1 reference signal resource(s) corresponds to a TCI-StateId.

In one subembodiment of the embodiment, the second reference signal resource set comprises M2 reference signal resource(s), M2 being a positive integer.

In one subsidiary embodiment of the above embodiment, M2 is equal to 1.

In one subsidiary embodiment of the above embodiment, M2 is greater than 1.

In one subsidiary embodiment of the subembodiment, any of the M2 reference signal resource(s) comprises a CSI-RS resource.

In one subsidiary embodiment of the subembodiment, any of the M2 reference signal resource(s) comprises a DMRS resource.

In one subsidiary embodiment of the subembodiment, any of the M2 reference signal resource(s) comprises an SRS resource.

In one subsidiary embodiment of the subembodiment, any of the M2 reference signal resource(s) comprises an SSB.

In one subsidiary embodiment of the subembodiment, any of the M2 reference signal resource(s) corresponds to a TCI.

In one subsidiary embodiment of the subembodiment, any of the M2 reference signal resource(s) corresponds to a TCI-State.

In one subsidiary embodiment of the subembodiment, any of the M2 reference signal resource(s) corresponds to a TCI-StateId.

In one subembodiment of the embodiment, M1 in the present disclosure is equal to M2 in the present disclosure.

In one subembodiment of the embodiment, the first reference signal resource set comprises M1 reference signal resources, and the second reference signal resource set comprises M2 reference signal resource; M1 and M2 are both positive integers greater than 1.

In one subsidiary embodiment of the subembodiment, any of the M1 reference signal resource(s) is different from any of the M2 reference signal resource(s).

In one subsidiary embodiment of the subembodiment, there at least exists one of the M1 reference signal resource (s) being different from any of the M2 reference signal resource(s).

In one subsidiary embodiment of the subembodiment, there at least exists one of the M2 reference signal resource (s) being different from any of the M1 reference signal resource(s).

In one embodiment, the fourth time-frequency resource set comprises more than one RE.

In one embodiment, the second signaling is used to indicate the fourth time-frequency resource set.

In one embodiment, the second signaling is used to indicate an MCS adopted by the second signal.

In one embodiment, the second signaling is used to indicate a HARQ process number of the second signal.

In one embodiment, the second signaling is used to indicate an RV adopted by the second signal.

In one embodiment, the second signal is generated by a 1B.

In one embodiment, the second signal is generated by a CB.

In one embodiment, the second signal is generated by a CBG.

In one embodiment, a physical-layer channel occupied by the second signal is a PDSCH.

In one embodiment, a transport channel occupied by the second signal is a DL-SCH.

In one embodiment, a type of quasi co-location between a demodulation reference signal of a channel occupied by the second signal and the second reference signal resource is at least one of QCL Type D, QCL Type A, QCL Type B or QCL Type C.

In one embodiment, the second signaling does not comprise a TCI field.

In one embodiment, a TCI field comprised in the second signaling is set as a fixed value.

In one subembodiment of the above embodiment, the fixed value is equal to all 0.

In one subembodiment of the above embodiment, the fixed value is equal to all 1.

In one embodiment, the second reference signal resource comprises a CSI-RS resource.

In one embodiment, the second reference signal resource comprises a DMRS resource.

In one embodiment, the second reference signal resource comprises an SRS resource.

In one embodiment, the second reference signal resource comprises an SSB.

In one embodiment, the second reference signal resource corresponds to a TCI.

In one embodiment, the second reference signal resource corresponds to a TCI-State.

In one embodiment, the second reference signal resource corresponds to a TCI-StateId.

In one embodiment, when an ID scrambling a CRC comprised in the first signaling is the same as an ID scrambling a CRC comprised in the second signaling, the second reference signal resource is the first reference signal resource; when an ID scrambling a CRC comprised in the first signaling is different from an ID scrambling a CRC comprised in the second signaling, the second reference signal resource is different from the first reference signal resource.

In one subembodiment of the embodiment, the meaning of the above phrase of an ID scrambling a CRC comprised in the first signaling being the same as an ID scrambling a CRC comprised in the second signaling includes: an ID scrambling a CRC comprised in the first signaling and an ID scrambling a CRC comprised in the second signaling are both the first ID.

In one subembodiment of the embodiment, the meaning of the above phrase of an ID scrambling a CRC comprised in the first signaling being the same as an ID scrambling a CRC comprised in the second signaling includes: an ID scrambling a CRC comprised in the first signaling and an ID scrambling a CRC comprised in the second signaling are both the second ID.

In one subembodiment of the embodiment, the meaning of the above phrase of an ID scrambling a CRC comprised in the first signaling being the same as an ID scrambling a CRC comprised in the second signaling includes: an ID scrambling a CRC comprised in the first signaling and an ID scrambling a CRC comprised in the second signaling are both a C-RNTI.

In one subembodiment of the embodiment, the meaning of the above phrase of an ID scrambling a CRC comprised in the first signaling being the same as an ID scrambling a CRC comprised in the second signaling includes: an ID scrambling a CRC comprised in the first signaling and an ID scrambling a CRC comprised in the second signaling are both a G-RNTI.

In one subembodiment of the embodiment, the meaning of the above phrase of an ID scrambling a CRC comprised in the first signaling being the same as an ID scrambling a CRC comprised in the second signaling includes: an ID scrambling a CRC comprised in the first signaling and an ID scrambling a CRC comprised in the second signaling are both a GC-RNTI.

In one subembodiment of the embodiment, the meaning of the above phrase of an ID scrambling a CRC comprised in the first signaling being the same as an ID scrambling a CRC comprised in the second signaling includes: an ID scrambling a CRC comprised in the first signaling and an ID scrambling a CRC comprised in the second signaling are both one of an SC-RNTI, an SC-PTM-RNTI or an SC-SFN-RNTI.

In one subembodiment of the embodiment, the meaning of the above phrase of an ID scrambling a CRC comprised in the first signaling being the same as an ID scrambling a CRC comprised in the second signaling includes: if a value corresponding to an ID scrambling a CRC comprised in the first signaling is equal to a value corresponding to an ID scrambling a CRC comprised in the second signaling.

In one subembodiment of the embodiment, the meaning of the above phrase of an ID scrambling a CRC comprised in the first signaling being different from an ID scrambling a CRC comprised in the second signaling includes: an ID scrambling a CRC comprised in the first signaling is the first ID, and an ID scrambling a CRC comprised in the second signaling is the second ID.

In one subembodiment of the embodiment, the meaning of the above phrase of an ID scrambling a CRC comprised in the first signaling being different from an ID scrambling a CRC comprised in the second signaling includes: an ID scrambling a CRC comprised in the first signaling is the second ID, and an ID scrambling a CRC comprised in the second signaling is the first ID.

In one subembodiment of the embodiment, the meaning of the above phrase of an ID scrambling a CRC comprised in the first signaling being different from an ID scrambling a CRC comprised in the second signaling includes: an ID scrambling a CRC comprised in the first signaling is a C-RNTI, and an ID scrambling a CRC comprised in the second signaling is an RNTI other than a C-RNTI.

In one subembodiment of the embodiment, the meaning of the above phrase of an ID scrambling a CRC comprised in the first signaling being different from an ID scrambling a CRC comprised in the second signaling includes: an ID scrambling a CRC comprised in the first signaling is an RNTI other than a C-RNTI, and an ID scrambling a CRC comprised in the second signaling is a C-RNTI.

In one subembodiment of the embodiment, the meaning of the above phrase of an ID scrambling a CRC comprised in the first signaling being different from an ID scrambling a CRC comprised in the second signaling includes: if a value corresponding to an ID scrambling a CRC comprised in the first signaling is not equal to a value corresponding to an ID scrambling a CRC comprised in the second signaling.

In one embodiment, an RNTI other than the C-RNTI in the present disclosure comprises one of a G-RNTI, a GC-RNTI, an SC-RNTI, an SC-PTM-RNTI or an SC-SFN-RNTI.

In one embodiment, when an ID scrambling a CRC comprised in the first signaling is the second ID, the second reference signal resource is the first reference signal resource; and when an ID scrambling a CRC comprised in the first signaling is the first ID, whether the second reference signal resource is the same as the first reference signal resource is related to an ID scrambling a CRC comprised in the second signaling.

In one subembodiment of the embodiment, when an ID scrambling a CRC comprised in the first signaling is the first ID, an ID scrambling a CRC comprised in the second signaling is the first ID, and the second reference signal resource is the same as the first reference signal resource.

In one subembodiment of the embodiment, when an ID scrambling a CRC comprised in the first signaling is the first ID, an ID scrambling a CRC comprised in the second signaling is the second ID, and the second reference signal resource is different the first reference signal resource.

In one subsidiary embodiment of the subembodiment, the second reference signal resource is predefined.

In one subsidiary embodiment of the subembodiment, the second reference signal resource is configured through an RRC signaling.

In one subsidiary embodiment of the subembodiment, the second reference signal resource is configured through a MAC CE signaling.

In one subsidiary embodiment of the subembodiment, the second reference signal resource is QCL with a demodulation reference signal of a PDCCH scheduling the second signal.

Embodiment 6

Figure 6:
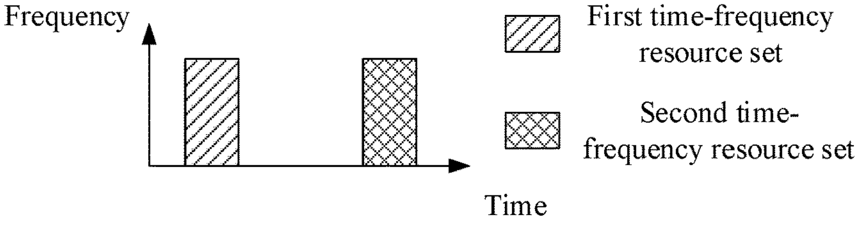
FIG. 6 illustrates a schematic diagram of a first time-frequency resource set and a second time-frequency resource set according to one embodiment of the present disclosure.

Embodiment 6 illustrates a schematic diagram of a first time-frequency resource set and a second time-frequency resource set, as shown in FIG. 6. In FIG. 6, the first time-frequency resource set and the second time-frequency resource set occupy a same subcarrier set in frequency domain, the subcarrier set comprises more than one subcarrier, and the first time-frequency resource set is orthogonal to the second time-frequency resource set in time domain.

In one embodiment, the subcarrier set occupies a subcarrier corresponding to more than one RB.

In one embodiment, a number of subcarriers occupied by the subcarrier set is a positive integral multiple of 12.

In one embodiment, frequency-domain resources occupied by the first time-frequency resource set belong to frequency-domain resources occupied by a CORESET.

In one embodiment, an OFDM symbol occupied by the first time-frequency resource set and an OFDM symbol occupied by the second time-frequency resource set belong to OFDM symbols occupied by a CORESET.

In one embodiment, a slot where the first time-frequency resource set is located and a slot where the second time-frequency resource set is located belong a slot in a slot set occupied by a search space.

In one embodiment, a slot where the first time-frequency resource set is located and a slot where the second time-frequency resource set is located belong a slot in a slot set occupied by a search space set.

Embodiment 7

Figure 7:
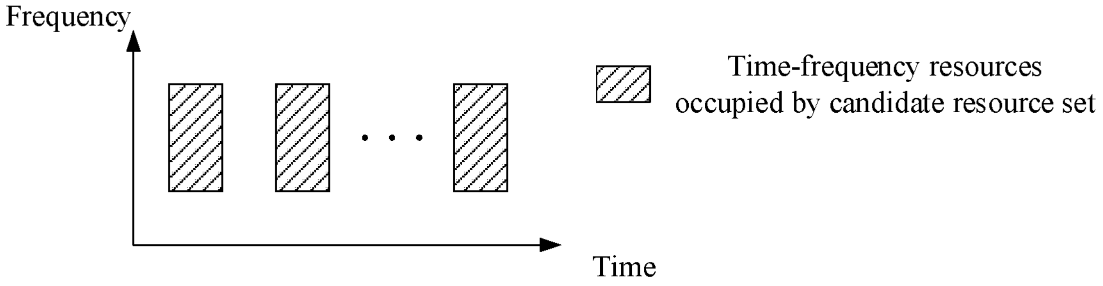
FIG. 7 illustrates a schematic diagram of a candidate resource set according to one embodiment of the present disclosure.

Embodiment 7 illustrates a schematic diagram of a candidate resource set, as shown in FIG. 7. In FIG. 7, the candidate resource set is associated with corresponding time-frequency resources occupied by a search space of a CORESET.

In one embodiment, the candidate resource set occupies more than 1 RE.

In one embodiment, the candidate resource set is periodically distributed.

In one embodiment, frequency-domain resources occupied by the candidate resource set belong to a first frequency band, the first frequency band occupies more than one subcarrier, and subcarriers occupied by the first frequency band are consecutive in frequency domain.

In one subembodiment of the embodiment, the first frequency band is Common Frequency Resources (CFRs).

In one embodiment, the first frequency band is a Bandwidth Part (BWP).

In one subembodiment of the embodiment, the first frequency band is a carrier.

In one subembodiment of the embodiment, the first frequency band is frequency-domain resources corresponding to a serving cell.

In one subembodiment of the embodiment, the first frequency band is configured for a transmission of an MBS.

Embodiment 8

Figure 8:
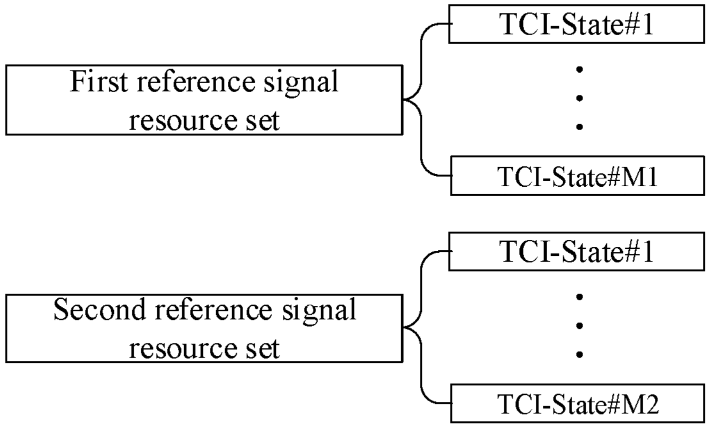
FIG. 8 illustrates a schematic diagram of a first reference signal resource set and a second reference signal resource set according to one embodiment of the present disclosure.

Embodiment 8 illustrates a schematic diagram of a first reference signal resource set and a second reference signal resource set, as shown in FIG. 8. In FIG. 8, the first reference signal resource set comprises M1 reference signal resource (s), and the M1 reference signal resource set(s) corresponds (respectively correspond) to TCI-State #1 to TCI-State #M1; the second reference signal resource set comprises M2 reference signal resource(s), and the M2 reference signal resource set(s) corresponds (respectively correspond) to TCI-State #1 to TCI-State #M2.

In one embodiment, the TCI State #1 to the TCI State #M1 corresponds (respectively correspond) to M1 TCI-StateId(s).

In one embodiment, any TCI-StateId in the M1 TCI-StateId(s) is a non-negative integer.

In one embodiment, the TCI State #2 to the TCI State #M2 corresponds (respectively correspond) to M2 TCI-StateId(s).

In one embodiment, any TCI-StateId in the M2 TCI-StateId(s) is a non-negative integer.

In one embodiment, the first reference signal resource set and the second reference signal resource set are respectively associated with two CORESET Pool identifiers.

In one embodiment, the first reference signal resource set and the second reference signal resource set are respectively associated with two TRPs.

In one embodiment, the first reference signal resource set and the second reference signal resource set are respectively associated with two serving cells.

In one embodiment, M1 is a positive integer greater than 1.

In one embodiment, M2 is a positive integer greater than 1.

In one embodiment, M1 is equal to M2.

In one embodiment, the first reference signal resource set and the second reference signal resource set are respectively used for a unicast transmission and a multicast groupcast transmission.

Embodiment 9

Figure 9:
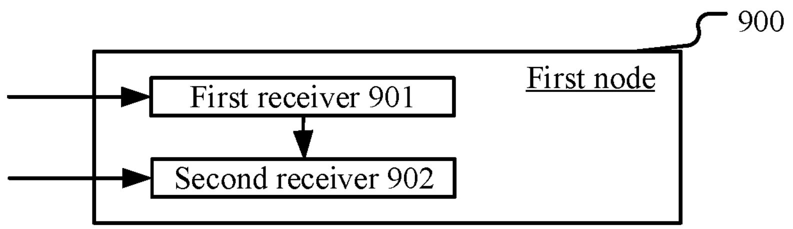
FIG. 9 illustrates a structure block diagram of a processing device in a first node according to one embodiment of the present disclosure.

Embodiment 9 illustrates a structure block diagram in a first node, as shown in FIG. 9. In FIG. 9, a first node 900 comprises a first receiver 901 and a second receiver 902.

The first receiver 901 receives a first signaling in a first time-frequency resource set, and the first signaling is used to indicate a first reference signal resource;

the second receiver 902 receives a second signaling in a second time-frequency resource set;

In embodiment 9, the first time-frequency resource set and the second time-frequency resource set are associated with a candidate resource set, and a first DCI format is a DCI format supported by the candidate resource set; a CRC comprised in information transmitted by adopting the first DCI format is scrambled by a first ID; time-domain resources occupied by the second time-frequency resource set are located after time-domain resources occupied by the first time-frequency resource set; a demodulation reference signal of a channel occupied by the second signaling and a target reference signal resource are quasi co-located, and a second DCI format is a DCI format supported by the candidate resource set; whether a CRC comprised in information transmitted by adopting the second DCI format can be scrambled by a second ID is used to determine whether the target reference signal resource is the same as the first reference signal resource; the first ID and the second ID are both non-negative integers, and the first ID is different from the second ID.

In one embodiment, the first receiver 901 receives a first signal in a third time-frequency resource set, and a demodulation reference signal of a channel occupied by the first signal and the first reference signal resource are quasi co-located.

In one embodiment, when a CRC comprised in information transmitted by adopting the second DCI format can be scrambled by the second ID, the target reference signal resource is different from the first reference signal resource; and when a CRC comprised in information transmitted by adopting the second DCI format cannot be scrambled by the second ID, the target reference signal resource is the first reference signal resource.

In one embodiment, the first ID is used for a unicast transmission, and the second ID is used for a transmission other than a unicast transmission.

In one embodiment, a CRC comprised in the first signaling is scrambled by the first ID, and the first signaling indicates the first reference signal resource out of a first reference signal resource set; or, a CRC comprised in the first signaling is scrambled by the second ID, and the first signaling indicates the first reference signal resource out of a second reference signal resource set; the first reference signal resource set is different from the second reference signal resource set.

In one embodiment, the second receiver 902 receives a second signal in a fourth time-frequency resource set; a demodulation reference signal of a channel occupied by the second signal and a second reference signal resource are quasi co-located; at least a former of an ID scrambling a CRC comprised in the first signaling or an ID scrambling a CRC comprised in the second signaling is related to whether the second reference signal resource is the same as the first reference signal resource.

In one embodiment, when an ID scrambling a CRC comprised in the first signaling is the same as an ID scrambling a CRC comprised in the second signaling, the second reference signal resource is the first reference signal resource; when an ID scrambling a CRC comprised in the first signaling is different from an ID scrambling a CRC comprised in the second signaling, the second reference signal resource is different from the first reference signal resource.

In one embodiment, when an ID scrambling a CRC comprised in the first signaling is the second ID, the second reference signal resource is the first reference signal resource; and when an ID scrambling a CRC comprised in the first signaling is the first ID, whether the second reference signal resource is the same as the first reference signal resource is related to an ID scrambling a CRC comprised in the second signaling.

In one embodiment, the first receiver 901 comprises at least first four of the antenna 452, the receiver 454, the multi-antenna receiving processor 458, the receiving processor 456 and the controller/processor 459 in embodiment 4.

In one embodiment, the second receiver 902 comprises at least first four of the antenna 452, the receiver 454, the multi-antenna receiving processor 458, the receiving processor 456 and the controller/processor 459 in embodiment 4.

Embodiment 10

Figure 10:
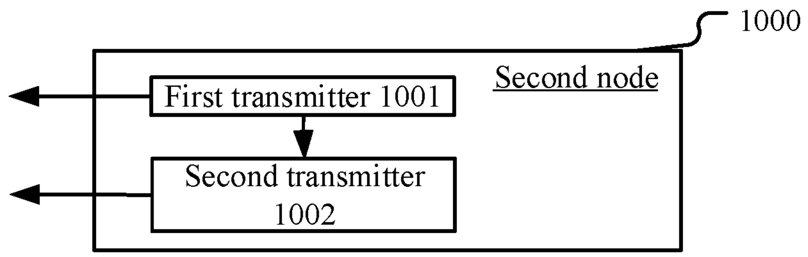
FIG. 10 illustrates a structure block diagram of a processing device in second node according to one embodiment of the present disclosure.

Embodiment 10 illustrates a structure block diagram in a second node, as shown in FIG. 10. In FIG. 10, a second node 1000 comprises a first transmitter 1001 and a second transmitter 1002.

The first transmitter 1001 transmits a first signaling in a first time-frequency resource set, the first signaling is used to indicate a first reference signal resource;

the second transmitter 1002 transmits a second signaling in a second time-frequency resource set;

In embodiment 10, the first time-frequency resource set and the second time-frequency resource set are associated with a candidate resource set, and a first DCI format is a DCI format supported by the candidate resource set; a CRC comprised in information transmitted by adopting the first DCI format is scrambled by a first ID; time-domain resources occupied by the second time-frequency resource set are located after time-domain resources occupied by the first time-frequency resource set; a demodulation reference signal of a channel occupied by the second signaling and a target reference signal resource are quasi co-located, and a second DCI format is a DCI format supported by the candidate resource set; whether a CRC comprised in information transmitted by adopting the second DCI format can be scrambled by a second ID is used to determine whether the target reference signal resource is the same as the first reference signal resource; the first ID and the second ID are both non-negative integers, and the first ID is different from the second ID.

In one embodiment, the first transmitter 1001 transmits a first signal in a third time-frequency resource set, and a demodulation reference signal of a channel occupied by the first signal and the first reference signal resource are quasi co-located.

In one embodiment, when a CRC comprised in information transmitted by adopting the second DCI format can be scrambled by the second ID, the target reference signal resource is different from the first reference signal resource; and when a CRC comprised in information transmitted by adopting the second DCI format cannot be scrambled by the second ID, the target reference signal resource is the first reference signal resource.

In one embodiment, the first ID is used for a unicast transmission, and the second ID is used for a transmission other than a unicast transmission.

In one embodiment, a CRC comprised in the first signaling is scrambled by the first ID, and the first signaling indicates the first reference signal resource out of a first reference signal resource set; or, a CRC comprised in the first signaling is scrambled by the second ID, and the first signaling indicates the first reference signal resource out of a second reference signal resource set; the first reference signal resource set is different from the second reference signal resource set.

In one embodiment, the second transmitter 1002 transmits a second signal in a fourth time-frequency resource set; a demodulation reference signal of a channel occupied by the second signal and a second reference signal resource are quasi co-located; at least a former of an ID scrambling a CRC comprised in the first signaling or an ID scrambling a CRC comprised in the second signaling is related to whether the second reference signal resource is the same as the first reference signal resource.

In one embodiment, when an ID scrambling a CRC comprised in the first signaling is the same as an ID scrambling a CRC comprised in the second signaling, the second reference signal resource is the first reference signal resource; when an ID scrambling a CRC comprised in the first signaling is different from an ID scrambling a CRC comprised in the second signaling, the second reference signal resource is different from the first reference signal resource.

In one embodiment, when an ID scrambling a CRC comprised in the first signaling is the second ID, the second reference signal resource is the first reference signal resource; and when an ID scrambling a CRC comprised in the first signaling is the first ID, whether the second reference signal resource is the same as the first reference signal resource is related to an ID scrambling a CRC comprised in the second signaling.

In one embodiment, the first transmitter 1001 comprises at least first four of the antenna 420, the transmitter 418, the multi-antenna transmitting processor 471, the transmitting processor 414 and the controller/processor 475 in embodiment 4.

In one embodiment, the second transmitter 1002 comprises at least first four of the antenna 420, the transmitter 418, the multi-antenna transmitting processor 471, the transmitting processor 414 and the controller/processor 475 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present disclosure includes but is not limited to mobile phones, tablet computers, notebooks, network cards, low-consumption equipment, enhanced MTC (eMTC) terminals, NB-IOT terminals, vehicle-mounted communication equipment, vehicles, cars, RSUs, aircrafts, diminutive airplanes, unmanned aerial vehicles, telecontrolled aircrafts and other wireless communication devices. The second node in the present disclosure includes but is not limited to macro-cellular base stations, femtocell, micro-cellular base stations, home base stations, relay base station, eNB, gNB, Transmitter Receiver Point (TRP), GNSS, relay satellites, satellite base stations, space base stations, RSUs, Unmanned Aerial Vehicle (UAV), test devices, for example, a transceiver or a signaling tester simulating some functions of a base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE), comprising:

a receiver configured to:

receive first control information in a first time-frequency resource set of a control resource set, wherein the first control information indicates a first reference signal resource; and receive second control information in a second time-frequency resource set of the control resource set, wherein the second control information is received over a channel having a demodulation reference signal, wherein:

the control resource set is associated with a first Downlink control information (DCI) format having a Cyclic Redundancy Check (CRC) that is scrambled by a first identity (ID) and is associated with a second DCI format, a quasi co-location of the demodulation reference signal and the first reference signal resource is based on a second ID with which a CRC of the second DCI format is scrambled, on a condition that the CRC of the second DCI format is scrambled by the second ID, the demodulation reference signal and the first reference signal resource are not quasi co-located, and on a condition that the CRC of the second DCI format is not scrambled by the second ID, the demodulation reference signal and the first reference signal resource are quasi co-located.

2. The UE according to claim 1, wherein the receiver is configured to receive data over a second channel having a demodulation reference signal that is quasi co-located with the first reference signal resource.

3. The UE according to claim 1, wherein the first ID is used for a unicast transmission, and the second ID is used for a transmission other than the unicast transmission.

4. The UE according to claim 1, wherein:

on a condition that a CRC of the first control information is scrambled by the first ID, the first control information indicates the first reference signal resource out of a first reference signal resource set or on a condition that a CRC of the first control information is scrambled by the second ID, the first control information indicates the first reference signal resource out of a second reference signal resource set.

5. The UE according to claim 1, wherein the receiver is configured to receive data in a fourth time-frequency resource set; a demodulation reference signal of a channel occupied by the data and a second reference signal resource are quasi co-located; at least a former of an ID scrambling a CRC of in the first control information or an ID scrambling a CRC comprised in the second control information is related to whether the second reference signal resource is the same as the first reference signal resource.

6. The UE according to claim 5, wherein:

on a condition that an ID scrambling a CRC of the first control information is the same as an ID scrambling a CRC of the second control information, the second reference signal resource is the first reference signal resource, and on a condition that when an ID scrambling a CRC of the first control information is different from an ID scrambling a CRC of the second control information, the second reference signal resource is different from the first reference signal resource.

7. The UE according to claim 5, wherein:

on a condition that an ID scrambling a CRC of the first control information is the second ID, the second reference signal resource is the first reference signal resource, and on a condition that an ID scrambling a CRC of the first control information is the first ID, whether the second reference signal resource is the same as the first reference signal resource is based on the ID scrambling the CRC of the second signaling.

8. The UE according to claim 1, wherein the first ID is a Cell Radio Network Temporary Identifier (C-RNTI), and the second ID is RNTI other than the C-RNTI.

9. The UE according to claim 1, wherein the first reference signal resource corresponds to a Transmission Configuration Indication (TCI).

10. A base station, comprising:

a transmitter configured to:

transmit first control information in a first time-frequency resource set of a control resource set, wherein the first control information indicates a first reference signal resource; and transmit second control information in a second time-frequency resource set of the control resource set, wherein the second control information is transmitted over a channel having a demodulation reference signal, wherein:

the control resource set is associated with a first Downlink control information (DCI) format having a Cyclic Redundancy Check (CRC) that is scrambled by a first identity (ID) and is associated with a second DCI format, a quasi co-location of the demodulation reference signal and the first reference signal resource is based on a second ID with which a CRC of the second DCI format is scrambled, on a condition that the CRC of the second DCI format is scrambled by the second ID, the demodulation reference signal and the first reference signal resource are not quasi co-located, and on a condition that the CRC of the second DCI format is not scrambled by the second ID, the demodulation reference signal and the first reference signal resource are quasi co-located.

11. The base station according to claim 10, wherein the transmitter is configured to transmit data over a second channel having a demodulation reference signal that is quasi co-located with the first reference signal resource.

12. The base station according to claim 10, wherein the first ID is used for a unicast transmission, and the second ID is used for a transmission other than the unicast transmission.

13. The base station according to claim 10, wherein:

on a condition that a CRC of the first control information is scrambled by the first ID, the first control information indicates the first reference signal resource out of a first reference signal resource set or on a condition that a CRC of the first control information is scrambled by the second ID, the first control information indicates the first reference signal resource out of a second reference signal resource set.

14. The base station according to claim 10, wherein the transmitter is configured to transmit data in a fourth time-frequency resource set; a demodulation reference signal of a channel occupied by the data and a second reference signal resource are quasi co-located; at least a former of an ID scrambling a CRC of in the first control information or an ID scrambling a CRC comprised in the second control information is related to whether the second reference signal resource is the same as the first reference signal resource.

15. The base station according to claim 14, wherein:

on a condition that an ID scrambling a CRC of the first control information is the same as an ID scrambling a CRC of the second control information, the second reference signal resource is the first reference signal resource, and on a condition that when an ID scrambling a CRC of the first control information is different from an ID scrambling a CRC of the second control information, the second reference signal resource is different from the first reference signal resource.

16. The base station according to claim 14, wherein:

on a condition that an ID scrambling a CRC of the first control information is the second ID, the second reference signal resource is the first reference signal resource, and on a condition that an ID scrambling a CRC of the first control information is the first ID, whether the second reference signal resource is the same as the first reference signal resource is based on the ID scrambling the CRC of the second control information.

17. The base station according to claim 10, wherein the first ID is a Cell Radio Network Temporary Identifier (C-RNTI), and the second ID is RNTI other than the C-RNTI.

18. A method, comprising:

receiving first control information in a first time-frequency resource set of a control resource set, wherein the first control information indicates a first reference signal resource; and receiving second control information in a second time-frequency resource set of the control resource set, wherein the second control information is received over a channel having a demodulation reference signal, wherein:

the control resource set is associated with a first Downlink control information (DCI) format having a Cyclic Redundancy Check (CRC) that is scrambled by a first identity (ID) and is associated with a second DCI format, a quasi co-location of the demodulation reference signal and the first reference signal resource is based on a second ID with which a CRC of the second DCI format is scrambled, on a condition that the CRC of the second DCI format is scrambled by the second ID, the demodulation reference signal and the first reference signal resource are not quasi co-located, and on a condition that the CRC of the second DCI format is not scrambled by the second ID, the demodulation reference signal and the first reference signal resource are quasi co-located.

* * * * *